Jan. 7, 1930.　　A. H. KENIGSBERG　　1,742,709
BUNKER
Filed Sept. 24, 1928　　7 Sheets-Sheet 1

Inventor
Alexander H. Kenigsberg
By Brown, Jackson, Boettcher & Dienner
Attys.

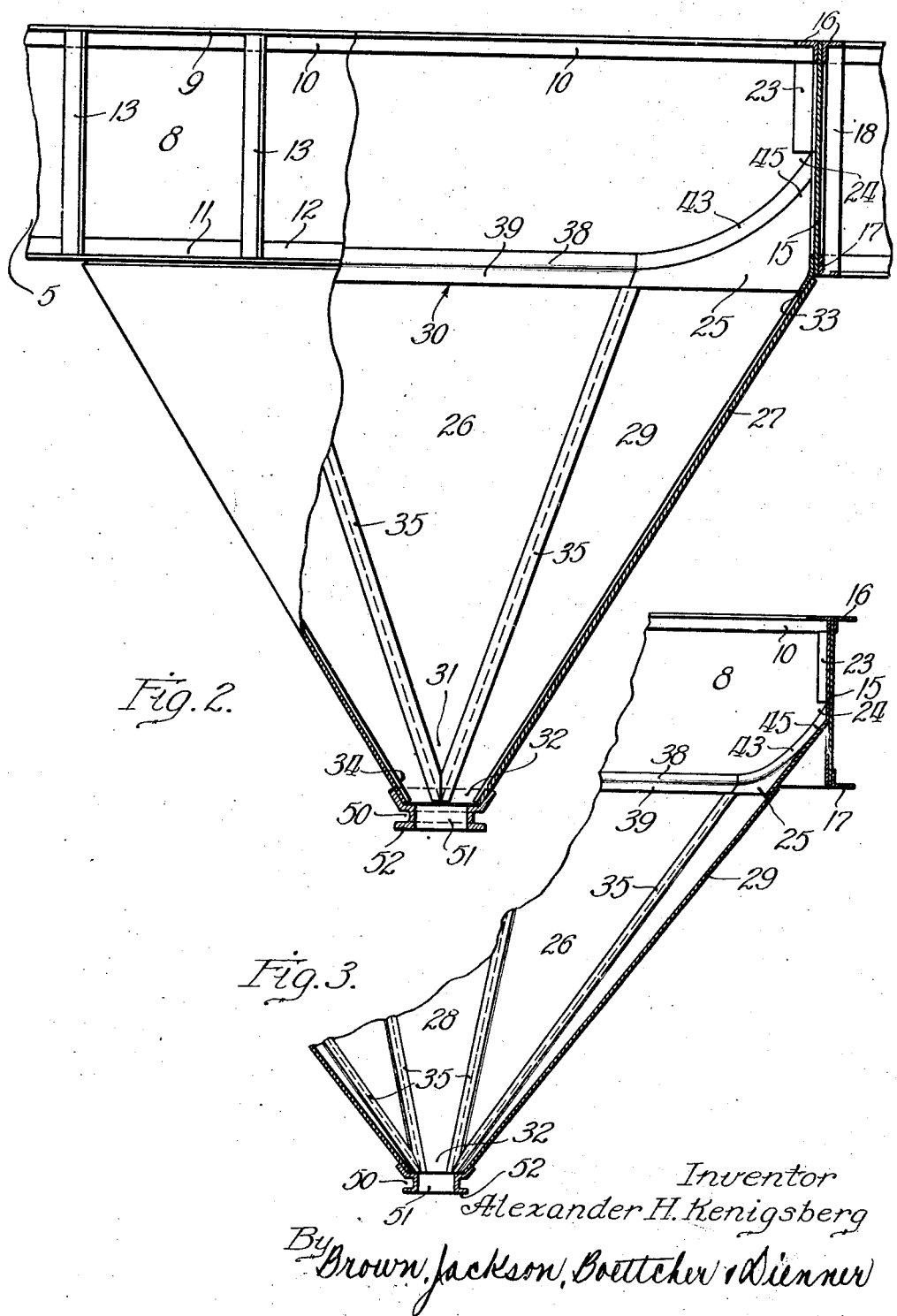

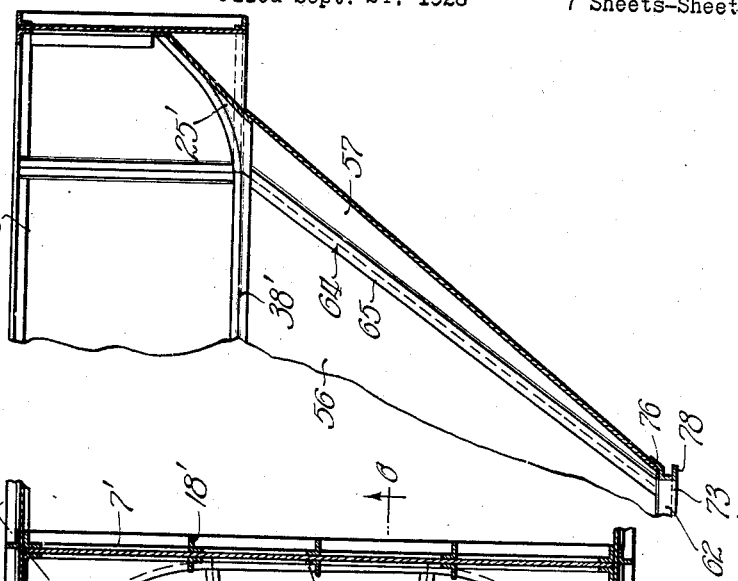
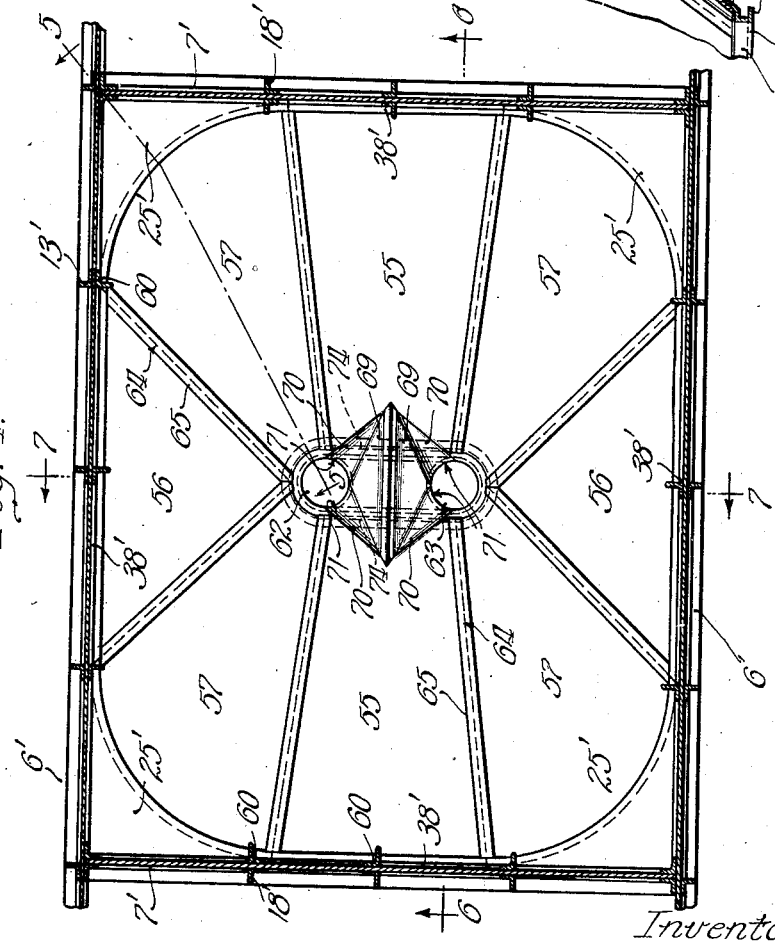

Inventor
Alexander H. Kenigsberg
By Brown, Jackson, Boettcher & Wiener
Attys.

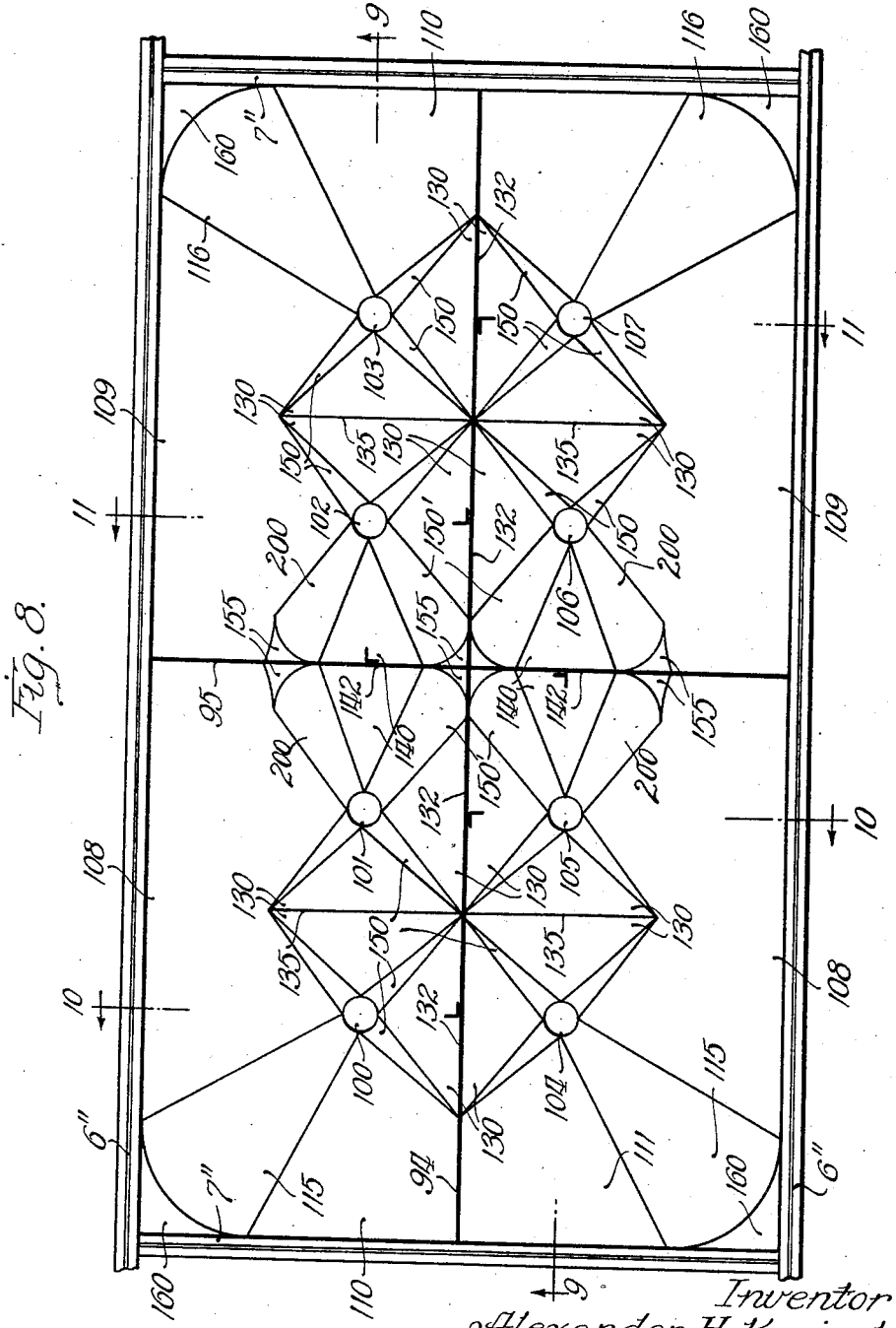

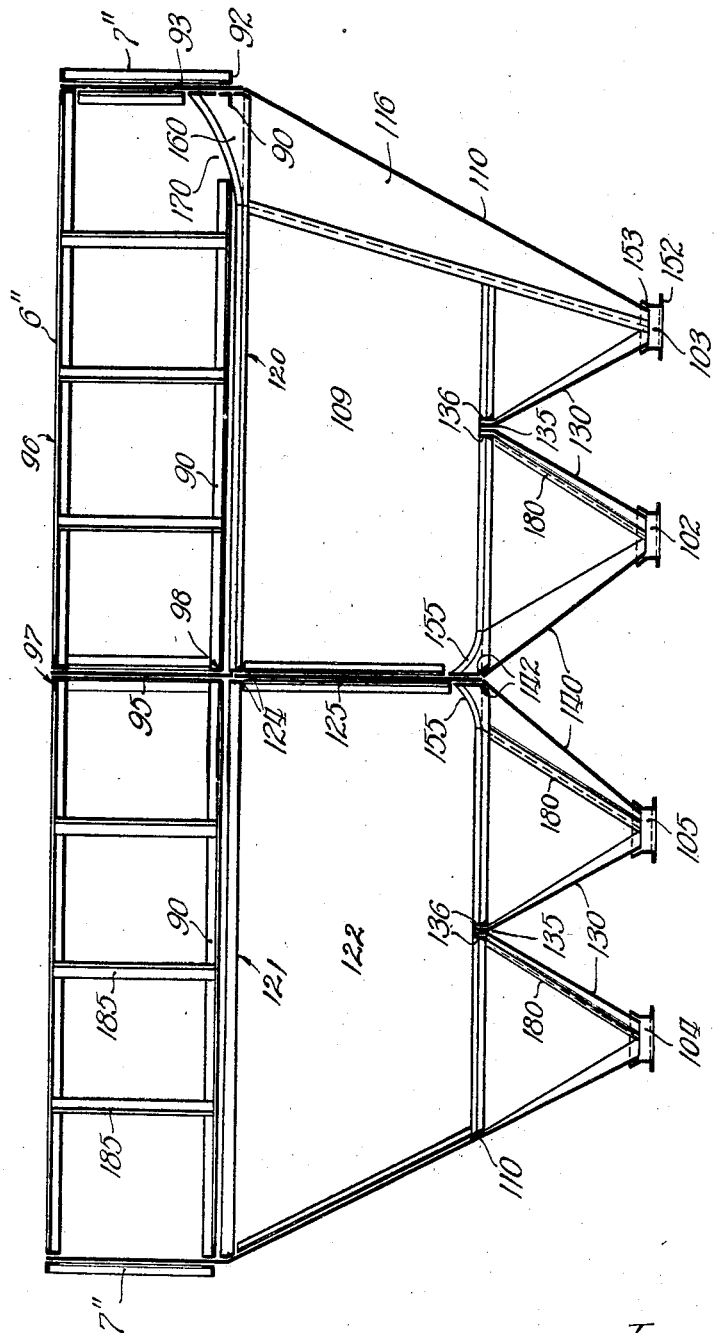

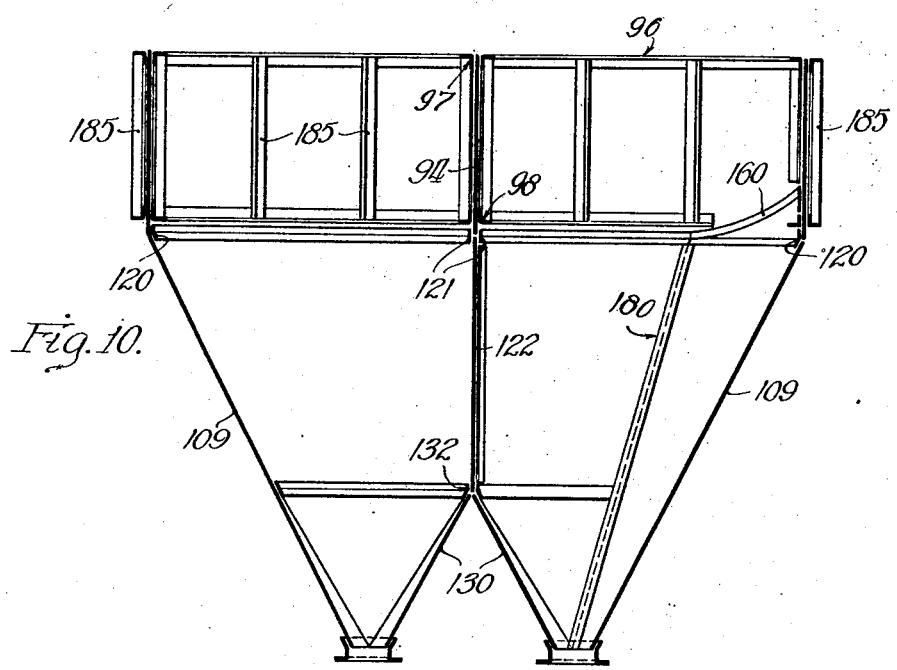
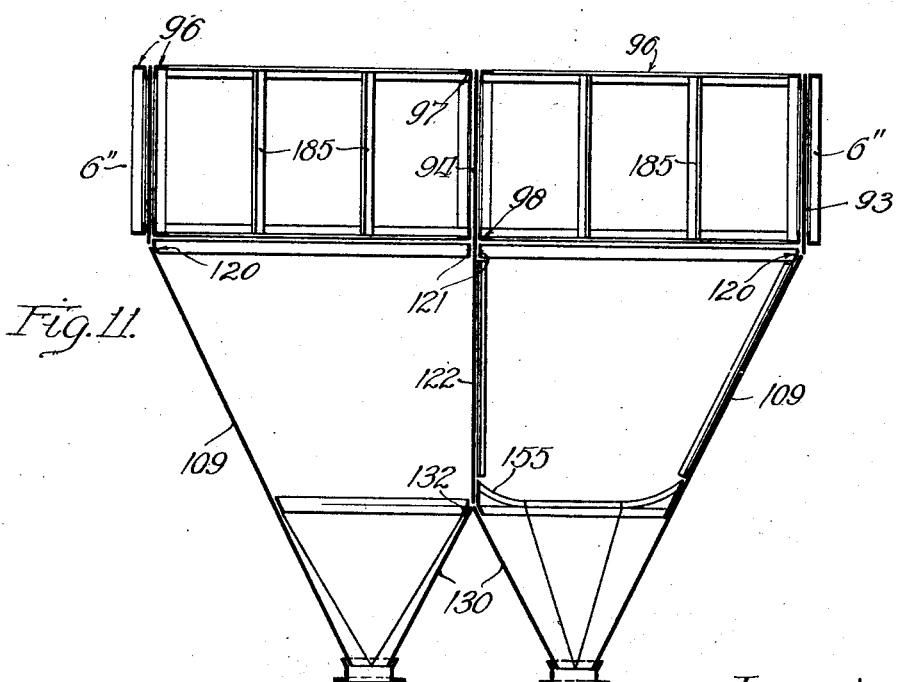

Patented Jan. 7, 1930

1,742,709

UNITED STATES PATENT OFFICE

ALEXANDER H. KENIGSBERG, OF CHICAGO, ILLINOIS

BUNKER

Application filed September 24, 1928. Serial No. 307,956.

This invention relates to bunkers and particularly to bunkers or bins of the type which have hopper bottoms through which the material stored in the bunker may be delivered.

While the bunker of my present invention is especially adapted for use in storing coal, it is to be understood that it may be used for storing ashes, sand, gravel, ores, grains or liquids, also as a weighing or shaking bin or bunker or for whatever else as well as wherever suitable or desired.

Owing to the rectangular or at least polygonal arrangement of the bunker supporting columns and girders usually employed, the rectangular or polygonal bunker has been generally adopted and is now in universal use.

These previous rectangular or polygonal bunkers, however, have numerous disadvantages. When the bunker is loaded relatively great flexural stresses are imposed upon the flat sides of the hopper portion with the result that relatively thick metal plate is required which increases the weight and cost of the bunker. In addition, stiffeners are usually necessary which further increase the cost considerably and frequently interfere with clearance requirements. The relatively sharp corners presented by the meeting sides form "valley angles" which cut down the effective slope of the bunker and out of which the contents of the bunker will not flow readily and from which the contents cannot be readily dislodged. Any increase in the slope of the side walls of the bunker in an effort to overcome this reduces the capacity of the bunker. The resulting joints at the valley angles take the load in flexure which tends to open the joints with the result that plural row riveting is usually required. Still further the effective span of the bottom flange of the bunker girder, in so far as lateral stiffness is concerned, is usually as great as the corresponding span of the girder, and consequently girder flange stiffeners are commonly required.

The object of the present invention is the provision of a generally improved, simplified and less expensive bunker construction adapted for use with usual rectangular or polygonal bunker supporting columns and girders and enabling of greater ease in shipping as well as field erection.

By introducing conical surfaces, in combination with flat surfaces, the bunker construction of the present invention tends to reduce the stresses in the hopper portion to the purely tensile type or to stresses more nearly approaching the tensile type. This permits of a reduction in the thickness of the metal to a minimum governed by other conditions which considerably reduces the weight and cost of the bunker. Stiffeners are reduced or may even be eliminated with further economy and the avoidance of interference with clearance requirements. Splices where required, are materially simplified and reduced in weight due to the reduction of the stresses involved to the purely tensile type. The reduction of the stresses to stresses of the tensile type also reduces or eliminates any tendency toward opening of the joints and adapts the invention for use as a container for liquids, such as soaps, oils and the like.

By introducing a novel bracket structure between the upper margins of the walls of the hopper and the bunker girders, the present invention effects a perfect junction between the angular girder framing and the rounded or conical hopper plates, and also reduces the effective span of the bottom flanges of the girders forming the bunker support in so far as lateral stiffness is concerned which obviates or reduces the bottom flange stiffening heretofore required, thus further cutting the weight and cost of the bunker.

The features of the present invention may be readily adapted to bunkers requiring two or more outlets as well as to bunkers of the single outlet type, with the same results of great strength and economy, reduction in weight, simplicity of design, assembly and erection, maximum utilization of available clearance and neat appearance without sacrificing the adaptability to the usual rectangular arrangement of the bunker supporting girders and columns, To acquaint those skilled in the art with the construction and operation of several embodiments of the invention, I shall now describe same in connection with the accompanying drawings, in which:

Fig. 2 is a vertical section taken on the line 2—2 of Fig. 1;

Fig. 3 is a fragmentary vertical section taken on the line 3—3 of Fig. 1;

Fig. 4 is a plan view of a double outlet bunker embodying the invention;

Fig. 5 is a fragmentary sectional view taken on the line 5—5 of Fig. 4;

Fig. 8 is a plan view of another form of plural outlet bunkers embodying the present invention;

Fig. 9 is a vertical longitudinal section taken on the line 9—9 of Fig. 8;

Fig. 10 is a vertical section taken on the line 10—10 of Fig. 8; and

Fig. 11 is a vertical section taken on the line 11—11 of Fig. 8.

Figure 1:
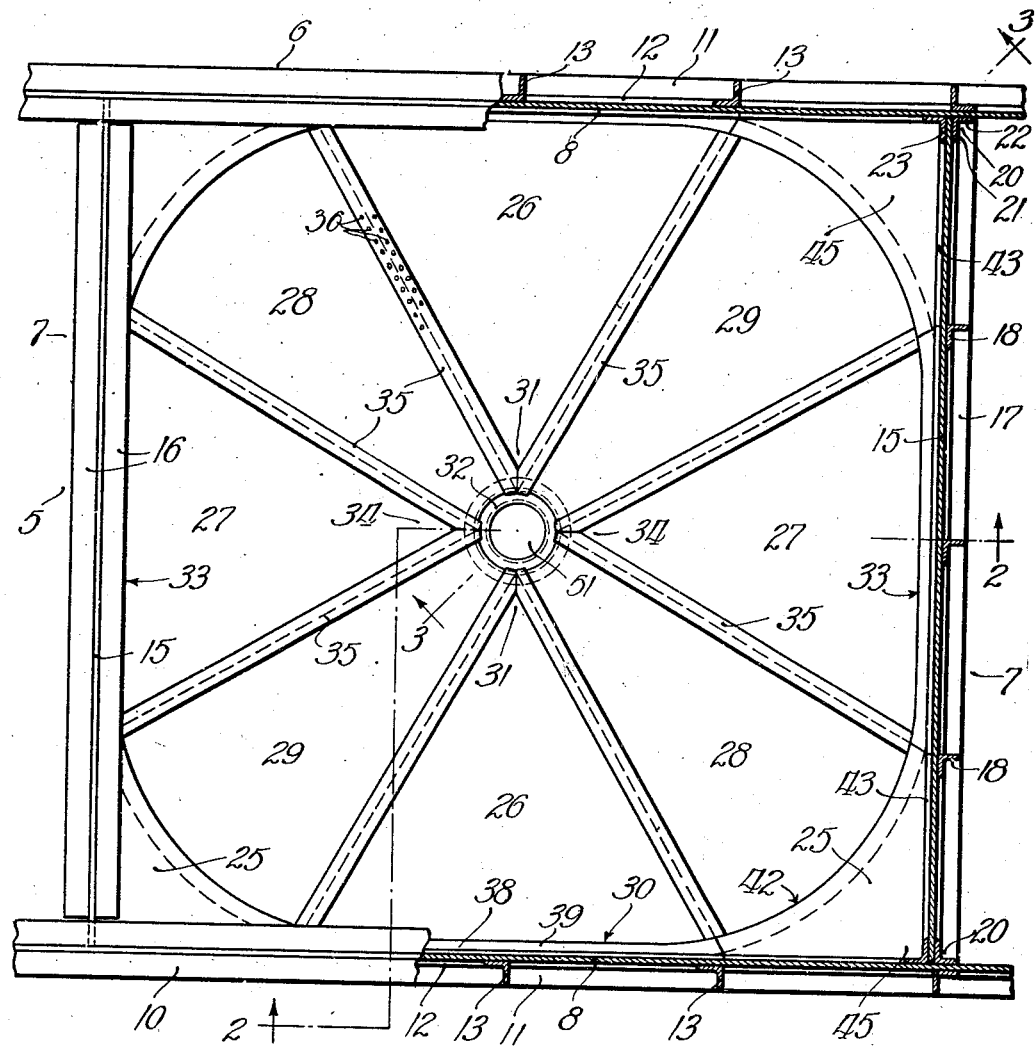
Fig. 1 is a plan view of a single outlet bunker embodying the present invention.
Figure 6:
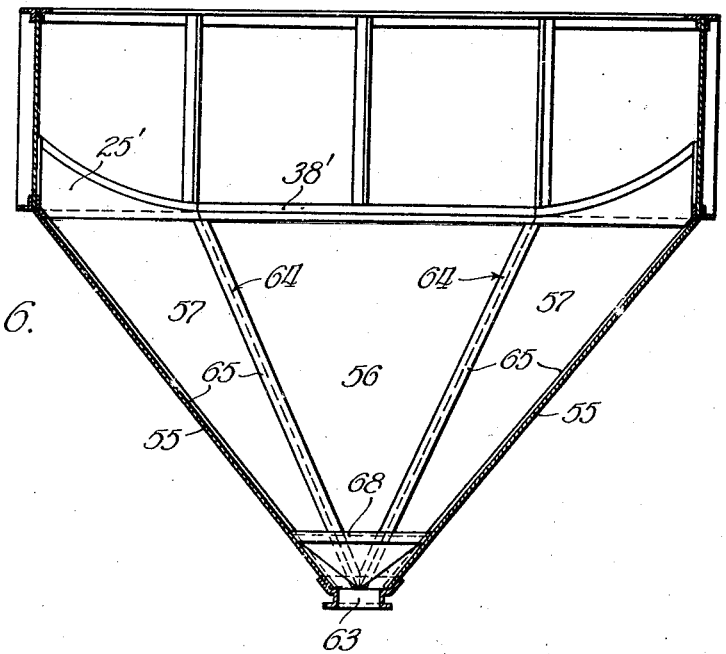
Fig. 6 is a vertical section taken on the line 6—6 of Fig. 4.
Figure 7:
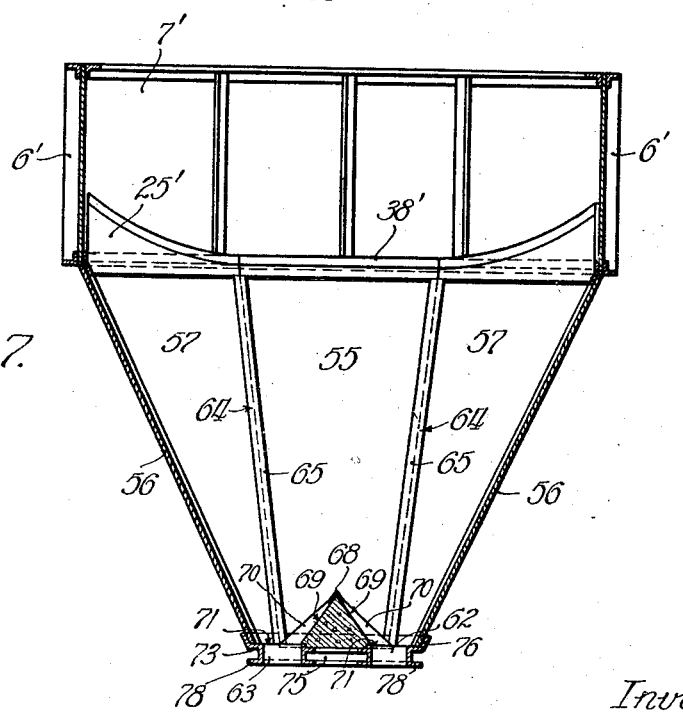
Fig. 7 is a vertical section taken on the line 7—7 of Fig. 4.

Referring first to the embodiment of Figs. 1, 2 and 3. The bunker support is indicated generally at 5 and comprises a pair of spaced parallel girders 6, 6 and a second pair of spaced girders 7, 7 extending therebetween. The girders 7, 7 are shown as being disposed normal to the girders 6, 6 and as secured at their opposite ends thereto. The configuration of the open frame formed by the girders 6, 6 and 7, 7 is typical of the rectangular configurations of usual bunker supports and it is an important aspect of the present invention to obtain the advantages as stated above and at the same time adapt or accommodate the hopper portion of the bunker to a support of this configuration.

Each of the girders 6, 6 comprises a plate 8 preferably of flat shaped steel bound along its upper margin by a pair of angles 9 arranged with their depending flanges 10 back to back with the upper marginal edge of the plate 8 riveted, welded or otherwise suitably secured therebetween. The lower edge of plate 8 is bound or stiffened or reinforced externally by an angle member 11 having its upright flange 12 riveted, welded or otherwise suitably secured to the lower marginal edge of the plate 8. Suitable vertical stiffeners which may be in the form of angle members 13 may be provided at suitably spaced intervals on the outer side of each of the girders 8, these stiffeners being interposed between the outwardly extending horizontal flanges along the top and bottom of the girder and being riveted, welded or otherwise suitably secured in place.

The other pair of girders 7, 7 similarly comprises the sheet steel plates 15 bound along their upper marginal edges externally and internally by the angle members 16, 16 and along their lower edges externally by the angle members 17. The structure of the girders 7, 7 is similar to the structure of the girders 6, 6 and the description therefore will not be repeated in detail, the girders 7, 7 preferably having suitable external stiffeners 18 similar to the stiffeners 13 of the girders 6, 6. The opposite ends of the girders 7, 7 abut the plates 8 of the girders 6, the inwardly extending flanges of the angles 10 along the inner upper margins of the girders 6 terminating at the inwardly extending flanges of the upper inner angles 16 of the girders 7 and fitting there-between or vice versa. The girder framing may, of course, be of the usual or any suitable or preferred construction.

The opposite ends of the girders 7 may be suitably joined to the girders 6 by suitable angle members 20 having flanges 21 riveted, welded or otherwise suitably secured to the plates 15 of the girders 7 and flanges 22 similarly secured to the plates 8 of the girders 6. Internally the ends of the girders 7 may be secured to the girders 6 by angle members 23. The tops of the angle members along the upper edges of the girders may be covered by means of suitable cover plates which are omitted for the sake of clearness.

The hopper portion of the bunker in this particular embodiment of the invention is made up of eight plates, two pairs of oppositely disposed flat plates 26, 26 and 27, 27 and two pairs of rounded or generally conical plates 28, 28 and 29, 29. The flat plates 26, 26 and 27, 27 are of triangular configuration with bases 30 disposed along the inside of the lower edges of the girder plates 8 and their apices 31 disposed at the outlet opening 32. The plates 27 are similarly of triangular configuration with their bases 33 along the inner sides of the lower margins of the girders 7 and their apices 34 at the outlet 32. It is to be understood that the plates 26 and 27 may be of trapezoidal form to provide for a generally rectangular outlet or of other shapes or a combination of shapes to provide any other desired form of outlet. The bases 30 and 33 of the flat plates 26 and 27 are preferably disposed intermediate the space between the girders 7 and similarly intermediate with the space between the girders 6. The conical or rounded plates 28 and 29 are disposed at the diagonally opposite corners, one between each pair of plates 26 and 27 and forming with said plates 26 and 27 when secured thereto a substantially continuous downwardly sloping hopper wall without corner pockets or valley angles.

As shown the adjacent or meeting edges of the plates 26, 27, 28 and 29 have butt engagement and these abutting edges may be welded directly together without splice plates or the like. Splice plates 35 are, however, shown along the seams or abutting edges of the flat and conical plates and on the inside of the hopper and these splice plates may be riveted to the two meeting edges joined thereby although it is to be understood that splice plates may be employed also outside or even where the flat and conical plates are welded together. A riveted joint is indicated at 36 in the drawings. It is also to be understood that a lap joint may be employed instead of a butt joint as shown.

The bases 30 or upper edges of the plates 26 and 27 are secured to the lower margins of the girder plates 8 and 15 by relatively short angle members or bent plates 38 the length of each of which is substantially equal to the length of the adjacent base or upper edge of the plate 26 or 27. The upper flanges of the angles 38 are riveted, welded or otherwise secured to the inner surfaces of the lower marginal edges of the plates 8 and 15 and the obliquely depending flanges 39 are riveted, welded or otherwise suitably secured to the upper edges or bases 33 of the plates 26 and 27.

The corner brackets 25 are in the form of corner plates rounded to form in effect substantial upward continuations of the conical plates 28 and 29 and having their lower edges 42 overlapping the upper edges of the plates 28 and 29 and riveted, welded or otherwise suitably secured thereto. From the opposite ends of the upper edge of each plate 28, 29, the corner brackets converge upwardly and the upwardly converging edges are flanges obliquely at 43 with these oblique flanges 43 riveted, welded or otherwise suitably secured to the girder plates 8 and 15.

The upper converging ends 45 of the corner brackets 25 fit in the spaces 24 below the corner angles 23 of the girder construction or may fit over them, and the ends of the corner brackets at the ends of the upper edges of the conical plates 28 and 29 fit between and preferably have abutting engagement with the angles 38. These inside rounded corner brackets 25 not only join the corners of the hopper portion of the bunker to the girder support and eliminate sharp corners and "dead" corner pockets but they reduce the effective span of the lower margins of the bunker girders laterally and obviate or reduce the necessity of bottom flange lateral stiffening generally required in the ordinary type of bunker. It is also often possible to reduce the length of the inside bottom flange of the bunker girders due to the introduction of these rounded brackets thus still further reducing the weight and cost of steel required.

While the conical portions of the hopper steel plates 28 and 29 are shown of circular curvature it is to be understood that any other second degree curvature such as an elliptical, parabolic or other suitable curvature may be employed. It will also be understood that the bend line of the angles or bent plates 38 may be at the lower edges of the girder plates as shown or below the bottom flanges of the girders as shown in Figs. 9, 10 and 11. Also whereas the flat or plane plates 26 and 27 of the hopper portion of the bunker are referred to as downwardly converging or of triangular configuration it is to be understood that they may be of trapezoidal or other suitable or preferred configuration and the location of the splicing may be arranged as suitable or desired.

From the foregoing it will now be apparent that with the combination of the flat plates 26 and 27 and generally conical plates 28 and 29 together with the structure of the corner brackets 25, the hopper portion of the bunker is adapted or accommodated to the rectangular arrangement of the bunker supporting columns and girders and at the same time all "valley angles" and "corner pockets" are eliminated. What is also important, any deflection of the plane portions of the hopper such as may be caused by loading the bunker, operates merely as an extension out of the already curved conical surfaces. The resulting action closely approaches tension upon the hopper portion of the bunker. This permits a reduction in the thickness of metal plate used thus reducing the weight, and improving the ease of shipment and erection, as well as reducing the cost. As already explained the accompanying reduction or elimination of stiffeners further decreases the weight and cost and reduces the clearance necessary and often permits of greater capacity. The character of the stresses as tensile stresses or as stresses approaching tensile stresses permits welding the joint between the plane and conical plates without likelihood of opening of the joints as is the tendency under flexural stresses in the usual rectangular bunkers. Where splices are used they are simplified and reduced in weight because of this stress reduction. The absence or reduction of stiffeners that may be damaged in shipment permits maximum assembly in the shop which further adds to the economy of the instant bunker. The reduction or elimination of stiffeners also permits shipping several hoppers within one another without fear of damage.

The resulting bunker is also neat in appearance. There are no stiffeners protruding outside the bunker and any deflection of the plane portions of the hopper plates that may be caused by loading the bunker is merely an extension of the already curved conical surfaces and is no longer an indication of structural weakness and constant cause for apprehension like the deflection of bunkers in other types. The present structure also presents a more uniformly smooth surface for inside lining than other types of bunkers and it presents a perfectly smooth outside surface for painting and all surfaces are entirely exposed and easily accessible for inspection and painting. The slope of the hopper sides in the bunker of the present invention may be decreased without danger of the contents "sticking" as there are no valley angles which cut down the effective slope of bunkers with such valley angles. This allows for greater capacities with given elevations. The joints are easily made tight against leakage and as already pointed out the bunker is adapted for use as a container for liquids. It is to be noted also that in the illustrated embodiments of the invention, every surface used is either plane or developable into a plane surface which will not require forging or pressing.

The outlet 32 is provided with an outlet member 50 having an outlet opening 51 and preferably in the form of a casting having an upwardly flaring or upwardly tapered socket for receiving the outlet of the hopper portion of the bunker which may be suitably secured therein and the lower end of the outlet member 50 is shown as provided with a radial flange 52.

Although the hopper structure is adapted for use with rectangular supports, it is also adapted to have a circular or curvilinear outlet casting 50, as shown, which castings are far more satisfactory both structurally and economically than rectangular castings. However, rectangular castings can be used where conditions warrant it.

In the embodiment of Figures 4, 5, 6 and 7, the girders 6', 6' and 7', 7' may be and are shown as being constructed similar to the construction of the girders 6 and 7 as described in detail in connection with Figs. 1, 2 and 3. The two pairs of girders may also be joined together as described in Figs. 1, 2 and 3 so that a detailed description of the same will not be necessary in connection with this embodiment of the invention. In this case the hopper portion of the bunker is composed of a pair of oppositely disposed flat trapezoidal plates 55, 55 in combination with a pair of opposite generally triangular plates 56 and two pairs of generally conical or rounded plates 57, all preferably of suitable sheet steel. The corner brackets 25' and angles 38' are joined to the plates 55, 56 and 57 and to the girder structures 6' and 7' substantially as before and with substantially the same advantages so that further details with reference thereto are believed unnecessary. In this case, however, the girders 6' and 7' are shown as being provided internally with upright angle stiffeners 60, one of which may be disposed opposite each of the stiffeners 13' and 18'. It is to be understood, of course, that these internal stiffeners may, if desired, be omitted or that suitable internal stiffeners may be employed with the girder structure of the embodiment of Figs. 1, 2 and 3.

The outlet openings indicated at 62 and 63 and the joint lines between the flat and conical plates are indicated at 64, it being understood that these plates 55, 56 and 57 may be welded directly together or may be welded or riveted with splice plates 65 as shown or with lap joints. As before, where the corner brackets are located as shown, portions of the inside bottom girder flanges are eliminated, the corner brackets taking care of the ends and also stiffening the girder laterally as well as the bunker as a whole.

In the embodiment of Figs. 4, 5, 6 and 7, the outer half of the opening 62 toward the girder 6' is formed by the lower ends of the flat plate 56 and the two adjacent conical plates 57 and the outer half of the other opening 63 is similarly formed, all substantially similar to the formation of one half of the opening 32 of the previous embodiment. In this case, however, the lower ends of the trapezoidal plates 55 bridge the spaces between the openings 62 and 63 and then for the purpose of obtaining a suitable slope toward the openings 62 and 63 in all directions a suitable filler 69 is employed. This filler may be either a solid filler of concrete or its walls may be formed of sheet metal diverging downwardly from the apex of the cross member 68 and terminate in a point at the respective openings 62 and 63. Any possible pockets, corners or valleys between the walls 69 and the plates 55 are eliminated by generally conical walls 70 interposed between the sides of the wall 69 and the adjacent edges of the wall 55 and rounded at their lower ends at 71 to complete the openings 62 and 63. The cross angle 68 extends between the plates 55 and protects the apex of the filler.

In this case the outlet member 73 is again shown in the form of casting with the circular or curvilinear outlet openings 62 and 63, the casting being webbed at 74 (Fig. 4) to join the two halves and cored at 75 to reduce the weight and allow for the closing gate connection. The outlet casting has an upwardly diverging marginal flange 76 for receiving the lower end of the hopper portion of the bunker and the casting is shown as being flanged at 78 adjacent the lower ends of the openings 62 and 63. The casting may be rectangular if desired.

While the structure shown in Figs. 4, 5, 6 and 7 has only two outlets, it is to be understood that the number of outlets may be multiplied arbitrarily.

Referring now to the embodiment of Figs. 8, 9, 10 and 11 which is a more or less schematic showing of another form of eight outlet devices embodying the present invention, the girder structure 6", 6" and 7", 7" may be substantially as described in connection with the previous embodiments. In this case, however, the lower margins of the girders 6", 7" are provided with internal angles 90 and these and the external angles 92 are spaced upwardly from the lower edges of the plates 93. The supporting frame formed by the girders 6" and 7" is divided longitudinally by a partition 94 extending parallel with and centrally between the girders 6", 6" and transversely by a partition 95 extending centrally between and parallel with the girders 7", 7".

The upper margins of the girders 6" and 7" are bound by external and internal angles 96 as before and the partitions 94 and 95 are preferably similarly formed of sheets of steel with the angles 97 along their upper edges and the angles 98 spaced upwardly from their lower edges and in the horizontal plane of the angles 90, 92. The corners of the girders 6", 7" may be joined as in the previous embodiment and the ends of the partitions 94 and 95 may be similarly secured to the outer girders as by means of suitable angles or in any other suitable or preferred manner.

The outlets are indicated at 100, 101, 102, 103, 104, 105, 106 and 107 respectively (Fig. 8) and these outlets are surrounded by the main sloping hopper portion which comprises two pairs of oppositely disposed duplicate plates 108 and 109 and two pairs of oppositely disposed duplicate plates 110 and 111 with two pairs of conical plates 115 and 116 disposed as shown. The plates 108 and 109 preferably have a simple or single inclination from the girders 6', 6' downwardly toward the outlets 100, 101, 102, 103, 104, 105, 106 and 107, and the plates 110 and 111 preferably have a simple or single inclination from the girders 7", 7" downwardly toward the outlets 100, 103, 104 and 107.

The upper marginal edges of the flat plates 108, 109, 110 and 111 are secured to the depending marginal edges of the girders 6" and 7" as by means of internal angle members or bent plates 100 as shown in Figs. 10 and 11. Depending from the longitudinal partition 94 and secured thereto at 121 is the depending hopper wall 122 and depending from the partition 95 (Fig. 11) and secured thereto at 124 is the hopper wall 125. For each four openings 100, 101, 104, 105 and 102, 103, 106, 107 there are four pairs of flat plates 130 the upper edges of two pairs of these plates meeting longitudinally along the lower marginal edges of the hopper wall or plate 122 and being secured thereto by angles or the like as indicated at 132 in Figs. 10 and 11. The other two pairs of plates 130 for each set of four outlets meet at 135 transversely between the girders 6", 6" and these meeting edges are secured to a suitable transverse angle or other supports 136. Interposed between the outlets 101, 105 and 102, 106 are two pairs of upwardly converging plates 140 meeting at 142 and secured as by means of suitable angle brackets or bent plates to the lower marginal edge of the plate or wall 135 depending upon the transverse partition 95. Interposed between the flat plates 130 and the outer flat plates 108, 109, 110 and 111, as well as between the plates 130, themselves are the conical or rounded hopper wall portions 150 the bases of which are disposed at the outlet openings. Between the plates 130 and 140 are the conical or rounded plates 150' the bases of which are at the tops with the converging ends at the outlet openings. Interposed between the plates 140 and the plates 108 and 109 are the conical plates 200 which are arranged similarly to the plates 150'.

The plates 130 and 140 are of generally triangular configuration and the outlet castings 152 may be provided with upwardly flared portions 153 for receiving the downwardly converging lower ends of the respective sloping hopper outlets. The flat and conical plates or hopper wall portions may be welded, riveted or otherwise suitably joined together and between the conical and flat plate portions along the transverse partition 95 are suitable brackets 155 which join the plates 150' and 200 to the depending wall 125 and to the outer flat plates 108 and 109. The corner plates or brackets 155 may be secured to the respective plates as set out in connection with the corner plates of the previous embodiments. The outer or upper marginal edges of the conical plates 115, 116 are joined to the girders 6", 7" by corner brackets 160. The structure and attachment to the girders 6" and 7" may be substantially identical with that described in connection with the corner brackets of the previous embodiments. The corner brackets 160 are preferably rounded in horizontal section as in the preceding embodiment and the corner brackets 155 are also preferably similarly rounded in horizontal section. The inner lower angles 90 along the lower margins of the sheets 93 of the girders 6" and 7" preferably terminate short of the inner corners of the generally rectangular girder support to form spaces 170 (Fig. 9) for receiving the corner brackets 160. It will be noted from the drawings that the corner brackets 160 are disposed along the lower margins of the girder supports whereas the corner brackets 155 are disposed along the lower margins of the upper hopper portion of the bunker.

Splice plates 180 are shown between the meeting marginal edges of at least some of the hopper plates but these hopper plates may be welded together without splice plates or welded or otherwise joined. The girders 6" and 7" are preferably provided internally and externally with angle or other suitable stiffeners 185.

While I have described the invention in connection with certain specific embodiments, it is to be understood that these are more or less illustrative and that the number of outlets and manner of combining the conical and flat hopper portions may be varied. For instance, the particular number of outlets may be multiplied as desired, and for example, in Figure 8, the outer two pairs of the larger intermediate conical portions 200 may be extended out further or up further to lessen or decrease the flat upper or outer areas 108 and 109 and if necessary, the other hopper portions may be varied to accommodate this increased upward extension.

Where I refer, in the specification and appended claims, to conical or generally conical plates or conical or generally conical hopper walls, I intend these terms to cover the plates, or walls of arcuate section and with the depending sides converging outwardly or any equivalent formations. For example, it is conceivable that the depending sides of these plates may be of other than downwardly converging formation by changing the shape of the flat plates which are combined therewith and I intend such departures to come within the scope of the present invention. In the embodiment shown, these plates or walls are of arcuate section and their depending sides converge downwardly. They might, therefore, be considered as segments of conically formed plates or walls or even as trajectories of conically formed plates or walls and the term conical or generally conical is used in a sense to cover such formations. The corner brackets are arcuate in horizontal section and preferably form continuations of these so-called generally conical plates or walls and where I refer to the brackets as being of arcuate horizontal section, I intend to cover such formations, although it is to be understood that these brackets may vary from true continuations of the curved plates or walls within the scope of the present invention.

I do not intend to be limited to the precise details shown or described.

I claim:

1. In a bunker, the combination of a plurality of supporting girders arranged in a polygonal figure, a hopper comprising a plurality of flat plates having their depending sides converging downwardly and secured along their upper margins to said supporting girders and sloping downwardly and inwardly to an outlet at their lower ends, and a plurality of generally conical plates arranged between said flat plates with their converging ends at said outlet whereby the flexural stresses in the hopper are reduced.

2. In a bunker the combination of a plurality of supporting girders arranged in a polygonal figure, a hopper comprising a plurality of flat plates having their depending sides converging downwardly and secured along their upper margins to said supporting girders and sloping downwardly and inwardly to an outlet at their lower ends, a plurality of generally conical plates arranged between said flat plates with their converging ends conforming with said outlet whereby the flexural stresses in the hopper are reduced, and rounded corner brackets between said supporting girders and the upper margins of said conical plates.

3. In combination, a generally polygonal girder support, a hopper sloping downwardly from said support and having a plurality of outlets arranged in a row, flat plates supported along their upper margins and sloping downwardly and inwardly toward said outlets with the depending sides of said flat plates converging downwardly, and generally conical plates alternating with said flat plates and secured thereto, whereby the flexural stresses of the hopper are reduced, said conical plates also sloping toward and conforming at their lower ends with said outlets.

4. In combination, a generally polygonal girder support, a hopper sloping downwardly from said support and having a plurality of outlets arranged in a row, flat plates supported along their upper margins and sloping downwardly and inwardly toward said outlets, said flat plates having their depending sides converging downwardly, generally conical plates alternating with said flat plates and secured thereto, whereby the flexural stresses in the hopper are reduced, said conical plates also sloping toward and conforming at their lower ends with said outlets, and rounded corner brackets between said girder support and the upper margins of said conical plates.

5. In combination, a generally polygonal girder support, a hopper sloping downwardly from said support and having a plurality of rows of outlets, flat plates having their depending sides converging downwardly and supported along their upper margins and sloping downwardly and inwardly toward said outlets, and generally conical plates alternating with said flat plates and secured thereto, said conical plates also sloping toward and conforming at their lower ends with said outlets, whereby the flexural stresses in the hopper are reduced.

6. In combination, a generally polygonal girder support, a hopper sloping downwardly from said support and having a plurality of rows of outlets, flat plates having their depending sides converging downwardly and supported along their upper margins and sloping downwardly and inwardly toward said outlets, generally conical plates alternating with said flat plates and secured thereto, said conical plates also sloping toward and conforming with said outlets whereby the flexural stresses in the hopper are reduced, and rounded corner brackets between said girder support and the upper margins of said conical plates.

7. In combination, a generally polygonal girder support, a hopper sloping downwardly from said support and having a plurality of outlets, said hopper comprising a pair of opposite flat plates having their lower ends extending between said outlets, said flat plates having their depending sides diverging upwardly and having their upper margins secured to the support, a second pair of opposite flat plates having their upper margins secured to the support and sloping downwardly and inwardly toward said outlets with their depending sides diverging upwardly, generally conical plates interposed between said first and last plates and converging toward and conforming with said outlets whereby the flexural stresses in the hopper are reduced, and rounded corner brackets between said conical plates and the girder support.

8. In a bunker the combination of a plurality of supporting girders arranged in a rectangular figure, a hopper comprising a plurality of generally triangular flat plates having their depending sides converging downwardly and secured along their upper margins to said supporting girders and having their apices sloping downwardly and inwardly, a plurality of generally conical plates arranged between said flat plates with their converging ends forming a circular outlet adjacent the apices of said first plates whereby the flexural stresses in the hopper are reduced and rounded corner brackets between said supporting girders and the upper margins of said conical plates, said rounded brackets being of generally triangular configuration with their lower margins secured to said conical plates and their other margins flanged and secured to said supporting girders.

9. The combination with a supporting frame comprising a plurality of girders arranged in a rectangular figure of a hopper consisting of a plurality of flat plates having their depending sides converging downwardly and a plurality of generally conical plates joined to said flat plates whereby the flexural stresses in the hopper are reduced, the joining of said flat and generally conical plates forming a continuous downwardly sloping wall and presenting a generally rectangular rounded corner upper margin for suspension from said frame and a generally circular outlet.

10. The combination with a supporting frame comprising a plurality of girders arranged in a rectangular figure of a hopper consisting of a plurality of flat plates having their depending sides converging downwardly and a plurality of generally conical plates joined to said flat plates whereby the flexural stresses in the hopper are reduced, the joining of said flat plates and said generally conical plates forming a continuous downwardly sloping wall and presenting a generally rounded corner rectangular upper margin for suspension from said frame and generally circular outlet, and angle members having flanges secured to the lower marginal edges of said girders and to the upper margins of said first plates, said angle members forming bottom flanges along the girder and joining the hopper thereto.

11. In a bunker, the combination of a plurality of supporting girders arranged in a polygonal figure, a hopper comprising a plurality of flat plates secured along their upper margins to said supporting girders and sloping downwardly and inwardly to an outlet at their lower ends, and a set of generally conical plates arranged between said flat plates whereby the flexural stresses in the hopper are reduced, the plates of one of said sets of plates having their opposite depending sides converging downwardly to said outlet.

12. In a bunker, the combination of a plurality of supporting girders arranged in a polygonal figure, a hopper comprising a plurality of flat plates secured along their upper margins to said supporting girders and sloping downwardly and inwardly to an outlet at their lower ends, a set of generally conical plates arranged between said flat plates whereby the flexural stresses in the hopper are reduced, the plates of one of said sets of plates having their opposite depending sides converging downwardly to said outlet, and rounded corner brackets between said supporting girders and the upper margins of said conical plates.

In witness whereof, I hereunto subscribe my name this 21st day of September, 1928.

ALEXANDER H. KENIGSBERG.